United States Patent [19]

Deters

[11] Patent Number: 5,227,957
[45] Date of Patent: Jul. 13, 1993

[54] MODULAR COMPUTER SYSTEM WITH PASSIVE BACKPLANE

[76] Inventor: John B. Deters, 17743 Soda Springs Rd., Los Gatos, Calif. 95030

[21] Appl. No.: 883,205

[22] Filed: May 14, 1992

[51] Int. Cl.$^5$ .................. H05K 7/10; G06F 1/16; H01R 9/09
[52] U.S. Cl. .................. 361/395; 361/391; 439/61; 439/74; 439/928; 312/223.2
[58] Field of Search .................. 439/61, 62, 74, 75, 439/928; 312/108, 111, 223.2; 364/708; 361/380, 390, 391, 392, 393, 394, 395, 399, 413, 415, 429

[56] References Cited

U.S. PATENT DOCUMENTS

| | | |
|---|---|---|
| 3,751,127 | 8/1973 | Black, Jr. et al. .................. 312/111 |
| 4,123,129 | 10/1978 | Butler .................. 312/111 X |
| 4,399,487 | 8/1983 | Neumann .................. 361/391 |
| 4,401,351 | 8/1983 | Record .................. 361/415 X |
| 4,433,881 | 2/1984 | Witten et al. .................. 312/111 X |
| 4,679,121 | 7/1987 | Schomers et al. .................. 361/413 |
| 4,683,550 | 7/1987 | Jindrick et al. .................. 361/413 X |
| 4,840,570 | 6/1989 | Mann, Jr. et al. .................. 361/413 X |
| 4,858,162 | 8/1989 | Kieffer et al. .................. 364/708 |
| 4,888,549 | 12/1989 | Wilson et al. .................. 361/415 X |
| 4,894,792 | 1/1990 | Mitchell et al. .................. 364/708 |
| 4,941,841 | 7/1990 | Darden et al. .................. 364/708 X |
| 4,967,311 | 10/1990 | Ferchau et al. .................. 361/395 |
| 4,991,058 | 2/1991 | Watkins et al. .................. 361/391 |
| 5,136,468 | 8/1992 | Wong et al. .................. 361/393 |

FOREIGN PATENT DOCUMENTS 387749 9/1990 European Pat. Off. .................. 361/415

Primary Examiner—Leo P. Picard
Assistant Examiner—Michael W. Phillips
Attorney, Agent, or Firm—James E. Eakin; Janet K. Castaneda

[57] ABSTRACT

A modular computer chassis with passive backplane is provided for a personal computer system with a plurality of open-ended and vertically or horizontally interconnectable bays, or a single case with bays, for slidably receiving component trays each having a printed double sided bus direction adaptor board with a bus connector at one end and a female bus connector mounted to the top surface for attaching an expansion card parallel to the board. The end bus connector extends through the back wall of the tray to connect to a female bus connector on a passive backplane connector board attached to the back of the chassis. The adaptor board converts the established bus connection between the card and female bus connector 90 degrees to the bus connector at the rear of the tray. A front cover, or individual tray covers, cover the front of the chassis as a locking and security mechanism. The bays connect and hold standard off-the-shelf personal computer components, and additional bays may be added and connected to the system, or used at remote locations, by means of an external cable harness or cable connector which attaches to the backplane board.

13 Claims, 7 Drawing Sheets

MODULAR COMPUTER SYSTEM WITH PASSIVE BACKPLANE

TECHNICAL FIELD

The present invention relates to a modular computer system having a main chassis with multiple bays, or assembled from multiple interconnected bays. The bays hold all of the individual off-the-shelf components selected for the computer system in slidable, removable trays, each tray connecting to a separate passive backplane board. The bays are separate interconnectable units particularly suitable for housing remote peripherals.

BACKGROUND OF THE INVENTION

Modular computer systems are known in the art. Such systems are typically confined to the central processing unit (CPU) of the system. Such systems are herein defined generally as designed to permit the removal of system components, such as disk drives and boards, without the extensive use of tools to remove the component or the system cover. Modular computer systems facilitate maintenance and service operations, allow easy upgrading operations, and provide some flexibility in the assembly of computer components. Such systems generally permit the ordinary user to rapidly change a system component thereby minimizing down time.

One such system is described in U.S. Pat. No. 4,934,764 to Leitermann et al. and includes an extensible frame for receiving slidable equipment enclosures for a mainframe computer. The back wall of the enclosures is open to form a cable way at the rear of the frame for cables which extend up and down the system to connect the various components in the enclosures.

Another mechanism for modular assemblies is described in U.S. Pat. No. 4,682,833 to Ferchau and includes a cabinet with cavities for drawers having electrical connections for attaching a disk drive for a supermini computer. The rear of each drawer includes a connector for attachment to a mating connector at the rear of the cabinet. A pin-and-aperture registration mechanism is included for proper alignment.

One other system is described in U.S. Pat. No. 4,530,066 to Ohwaki et al. The Ohwaki system expands a personal computer by sliding the electrically connected power and main signal processing section apart so that an additional signal processing section contained in a housing may be inserted into an electrical connector.

Backplane assemblies are also known in the art. Such assemblies generally consist of a series of multiway sockets wired in parallel and connected to the buses of the computer to enable the computer to communicate with peripherals, such as disk drives, boards, controllers, etc. Once such assembly is described in U.S. Pat. No. 4,971,563 to Wells which uses a backplane removably attached to the chassis of a CPU for mounting accessory boards.

A heretofore unmet need exists for a computer system in which all some or all system components are modular and connect to a passive backplane, and which is adapted for use with off-the-shelf computer system components.

SUMMARY OF THE INVENTION WITH OBJECTS

A general object of the invention is to provide a modular computer system that overcomes the limitations and drawbacks of the prior art.

Another general object of the invention is to provide a modular computer system enabling off-the-shelf computer components to be installed from the front, as opposed to from the top, of the computer.

A specific object of the invention is to provide a modular computer system having a unitary chassis with multiple bays, or a chassis assembled from interconnected bays, carrying slidable trays for plug in attachment of conventional computer components, each tray interfacing one or more said components to a backplane connector board, and wherein the backplane is, in at least some cases, passive.

Another specific object of the invention is to provide a modular computer system with a circuit board assembly which changes the bus direction 90 degrees for converting a conventional expansion card edge connection to a pin or receptacle type of connection.

Still another specific object of the invention is to provide a modular computer system that may be expanded by adding additional bays, the bays further usable at remote locations and capable of housing multiple system components within a single bay.

Yet one more specific object of the invention is to provide a modular computer system with cartridges for housing the individual standard expansion cards prior to insertion into the trays.

In accordance with the present invention, a modular computer chassis with passive backplane is provided for a computer system.

The chassis defines a frame constructed from a single enclosure or assembled from a plurality of open-ended and vertically or horizontally interconnectable bays for slidably receiving trays. A unitary front cover, or individual tray covers, is used to cover the front of the chassis and as a locking and security mechanism. The chassis supports and secures all of the system components.

Each tray defines a bottom surface, a back and a front wall, and a side wall. A printed double sided bus direction adaptor board is attached to the bottom surface of each tray. Each adaptor board has an edge card or connector interface at one end, and may have one or more female bus connectors mounted to the top surface of the board. A male connector, such as a pin or receptacle, may be mounted on the interface end of the adaptor board to extend through the back wall. The female bus connector(s) may be housed within one or more recesses formed in the side wall.

One or more expansion cards, such as a video graphics board, is mounted in a tray by inserting its edge connector into the female bus connector on the bus direction adaptor board. The adaptor board converts and changes the established bus connection between the card and female bus connector 90 degrees to the bus connector at the rear of the tray.

A preferred embodiment includes a chassis with a plurality of interconnected bays for standard off-the-shelf computer components including a memory expansion card, an internal modem, a network interface card, a power supply with a battery backup system, and an open bay for two optional components as desired. Other arrangements are contemplated and additional bays may be added and connected to the system through an external cable harness.

The preferred embodiment also includes cartridges for encasing the off-the-shelf expansion cards. The cartridges enable the cards to be installed and removed from the trays without touching the component elements.

A unitary back cover is provided to slide mount over the outer surface of the chassis. Attached to the inside of the cover is a passive backplane board with typically seven bus connectors. When the back cover is in place and the trays are slid completely into the bays, the bus connector at the rear of each component tray mates with the bus connector on the passive backplane.

Additional bays may be added to the chassis and connected to the passive backplane board with additional smaller bus boards or with cable connectors.

A cable block and harness may be attached to the passive backplane in order to attach I/O devices such as a monitor, printer, keyboard, external disk drive, etc. The cable harness further allows a remote bay to be attached to the system.

In a second aspect of the invention, a unitary chassis defines a plurality of bay slots for receiving trays as described above. In this aspect, additional separate bays may be attached to the chassis and connected to the backplane by cables. Additionally, a cable harness may be used to attach a remote bay to the system.

In a third aspect of the invention, a larger bay is provided for a standard full-sized motherboard for use with the modular system. Other components may be mounted in bays and used as separate modules at a remote monitor and keyboard station.

These and other objects, features, aspects and advantages of the present invention will be more fully apparent to those skilled in the art upon consideration of the following detailed description of the preferred embodiments, presented in conjunction with the accompanying drawings.

DETAILED DESCRIPTION OF PREFERRED EMBODIMENTS

Figure 1:
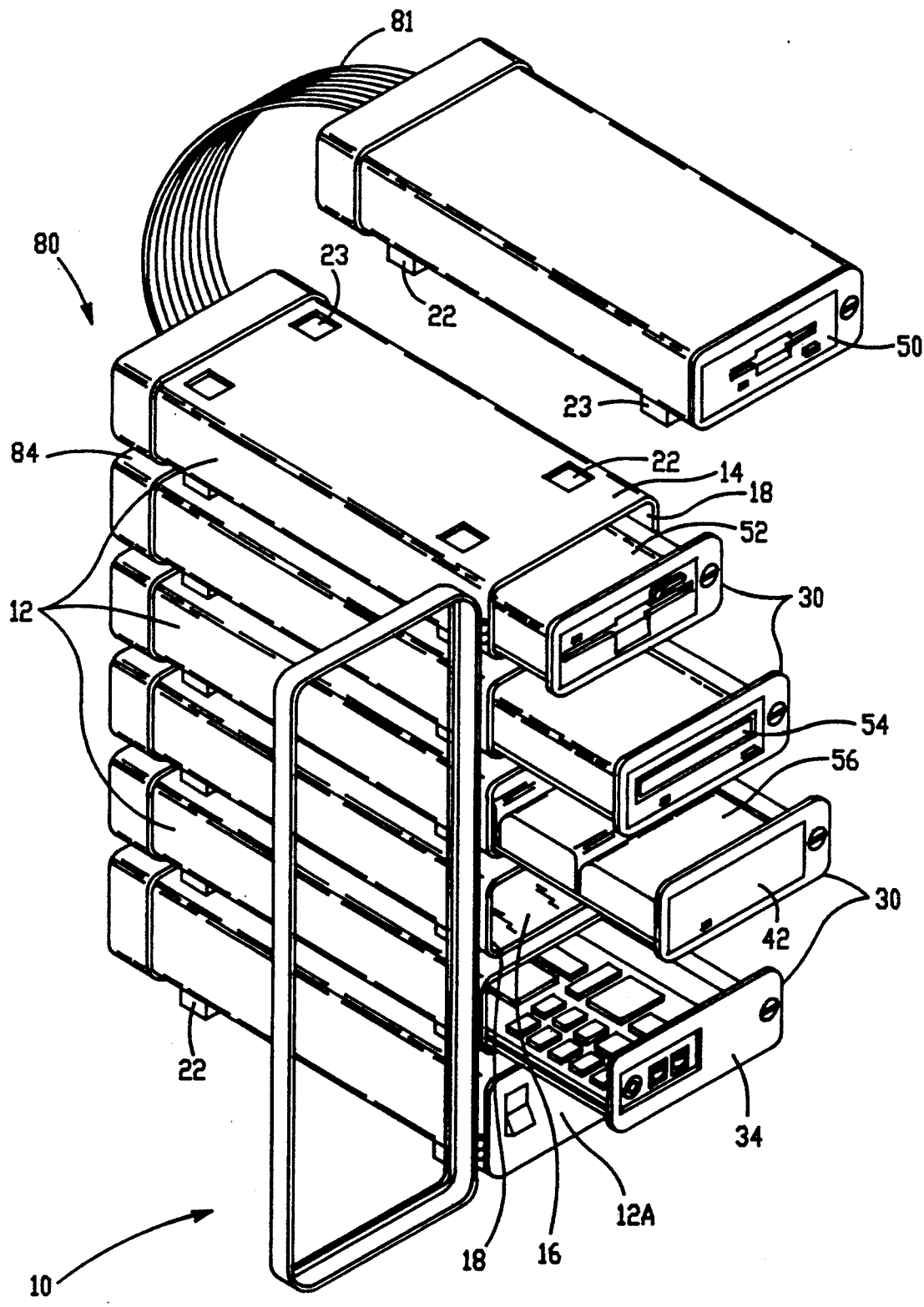
FIG. 1 is a perspective view in elevation of a preferred embodiment of the modular computer chassis with passive backplane showing six vertically stacked bays, an additional bay attached to the passive backplane board by a cable, and further showing several open trays with some system components in cartridges. The back cover is attached to the chassis and the front cover is open.

A modular computer chassis with passive backplane and embodying the principles of the present invention is shown in FIG. 1 generally as reference numeral 10.

Figure 2:
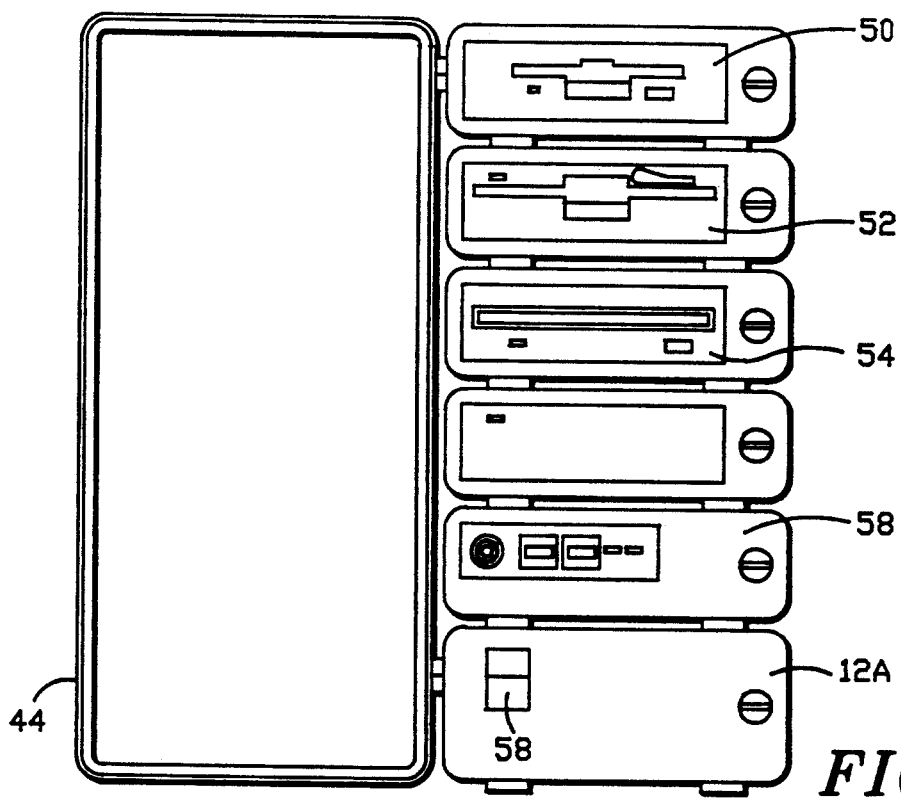
FIG. 2 is an front view of the six stacked bays of FIG. 1 and the front cover.

The chassis 10 is formed by vertically, or horizontally, stacking individual interconnecting bays 12. The bays 12 are typically constructed from a molded rigid plastic with an EMI protective surface coating on the inside, or they may be made from any suitable material such as aluminum or other plastics. The open-ended bays 12 are generally rectangular and include a top wall 14, a bottom wall 16, and side walls 18. For PC applications, the bays 12 are sized to accommodate a standard expansion card. As shown in FIG. 2, the bottom bay 12A may be slightly higher than the other bays to accommodate a power supply. The chassis 10 formed from the interconnecting bays 12, supports and secures all of the system components.

The top wall 14 and the bottom wall 16 of the bays 12 define complementary stacking spacers 22 and recesses 23. The spacers 22 may also be located on the side walls 18 for horizontal system configurations. It is contemplated that the bays 12 may be arranged as desired for the convenience of the user. It is further contemplated that the bays 12 may be used at remote locations and connected to the chassis by cables, as later described herein.

Figure 4:
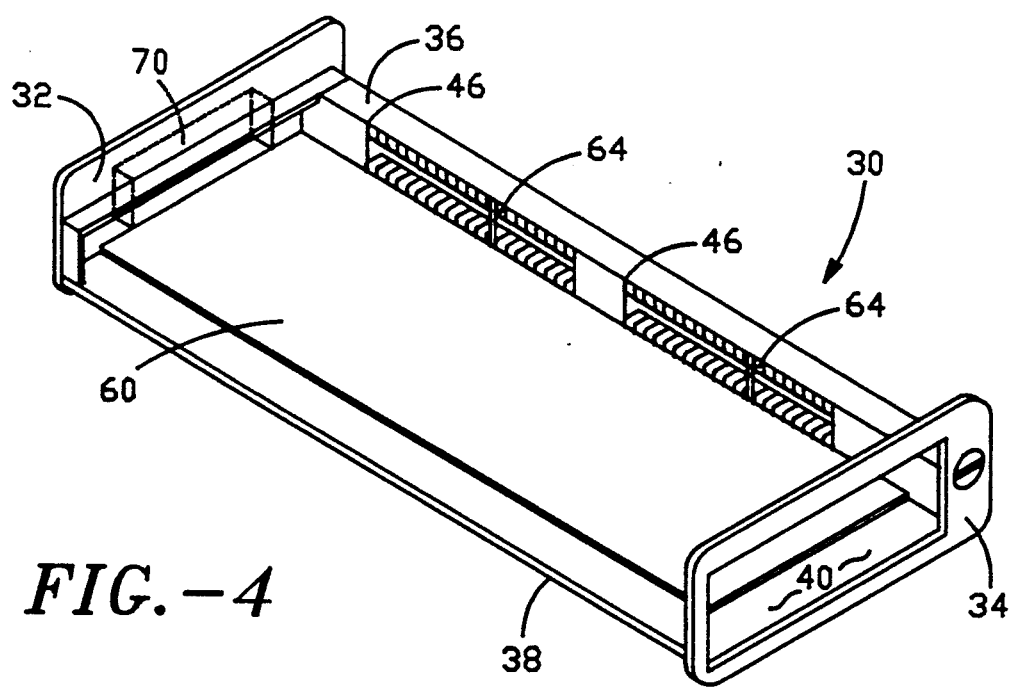
FIGS. 4 and 4A are perspective views in elevation of trays showing the bus direction adaptor board, two sixteen bit connectors and a single 16 bit female edge card bus connector, respectively, for expansion cards and the rear mating bus connector that interfaces to the backplane.
Figure 5:
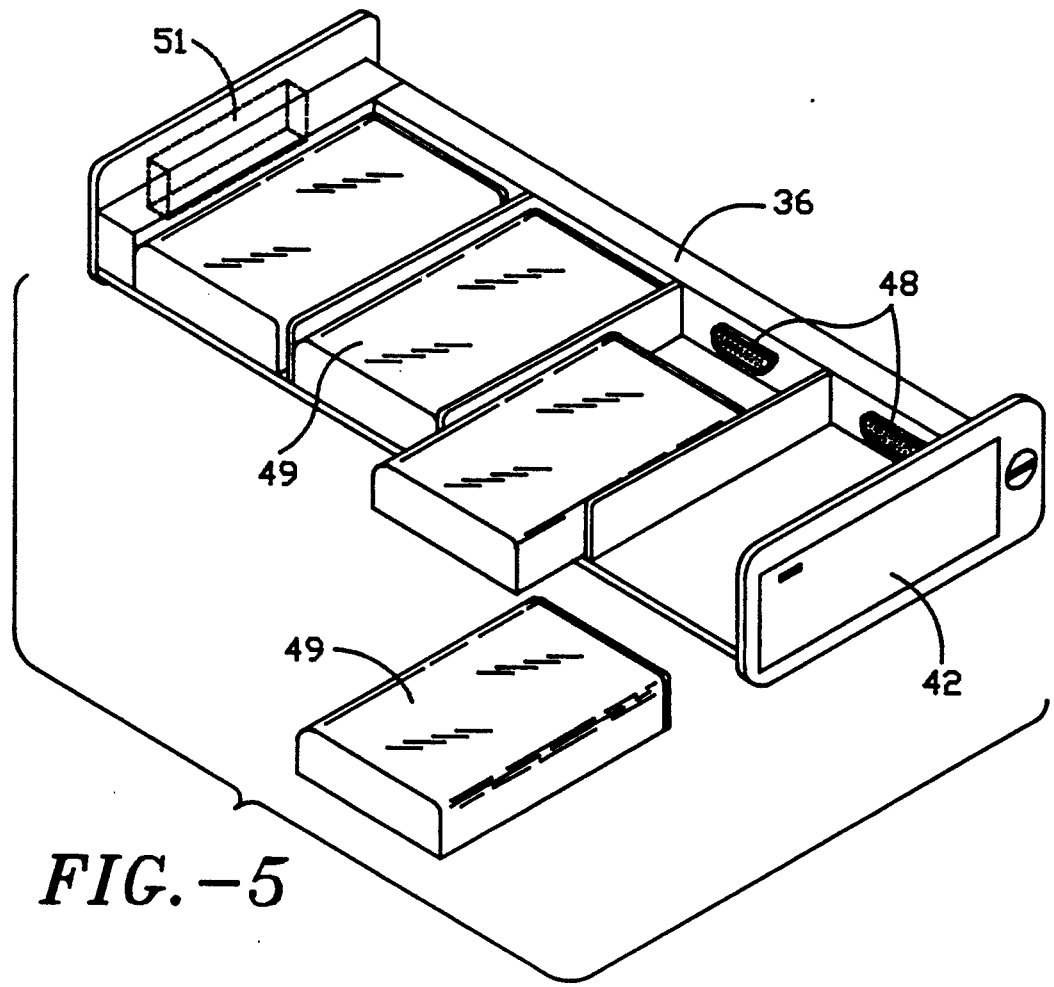
FIG. 5 is a perspective view of a tray showing four hard disk drives in cartridges and a controller connector for connection to a hard drive controller cartridge (not shown) mounted in a contiguous tray.
Figure 6:
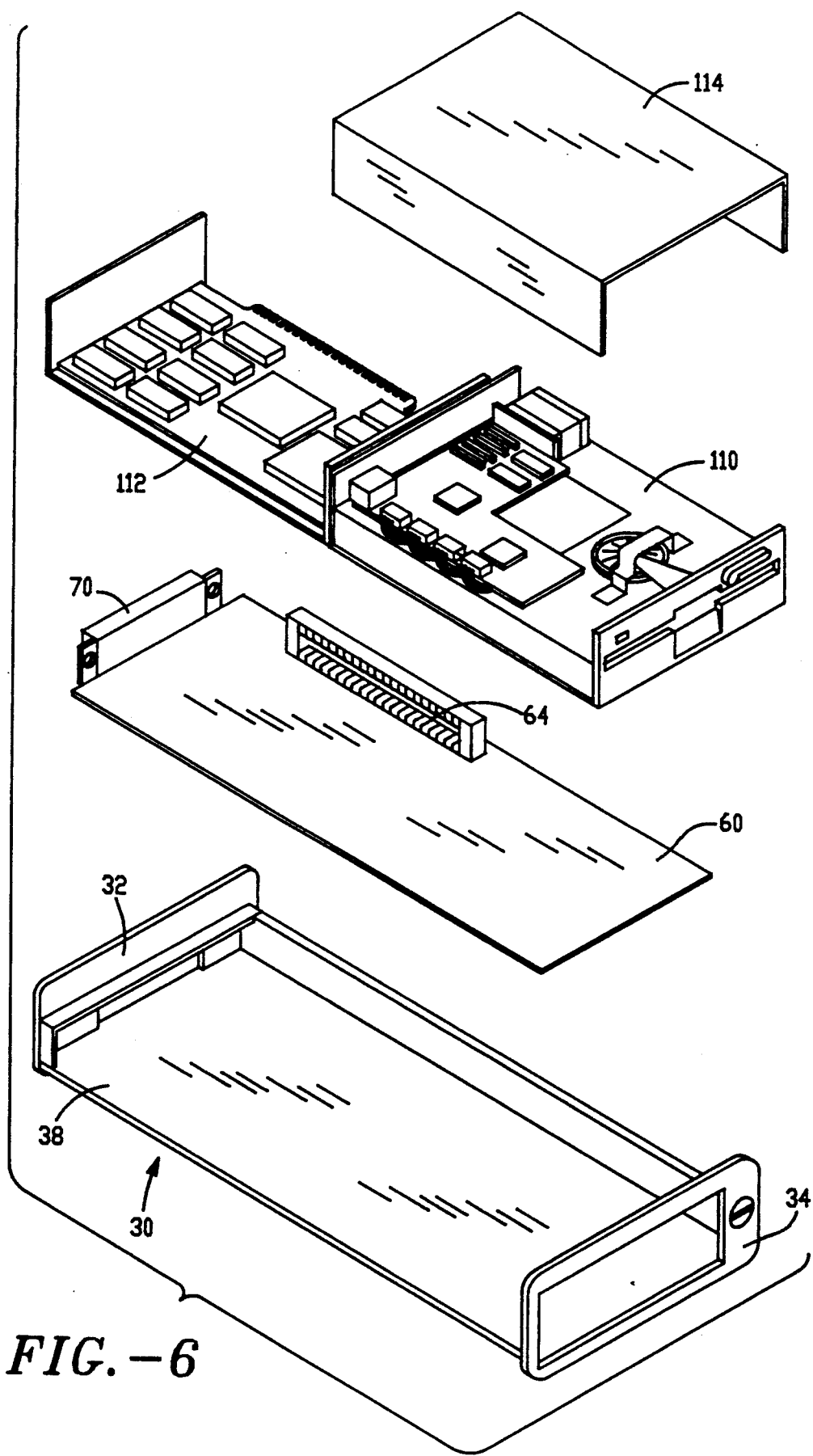
FIG. 6 is an exploded view of a tray, bus adaptor board and eight bit female bus connector, controller card, cartridge housing and off-the-shelf floppy disk drive.

Referring now to FIGS. 1, 4 and 6, a tray 30 is slidably and removably installed in each bay 12. Each tray 30 defines a back wall 32, a front wall 34, a side wall 36, and a bottom wall 38. The front wall 36 preferably defines an access opening 40, and a separate tray cover 42 may be used to cover opening 40, as shown in FIG. 5.

Each tray 30 may include an insert/eject mechanism (not shown) to slide the tray 30 in and out of the bay 12 and to insure a secure connection with a back plane connector at the rear of the bay 12. Interlocking mechanisms may also be provided to prevent unauthorized or unintentional removal of a component from the system.

As best shown in FIG. 2, an optional chassis front door 44 is hinged to the bay sides 18 and slides over the chassis 10 when closed. The door 44 is of unitary construction to encase the system and prevent electromagnetic emissions from the system. The door 44 is opened to gain access to individual components within the trays 30. The door 44 may include a locking mechanism to secure all bays 12 and system components.

Figure 4A:
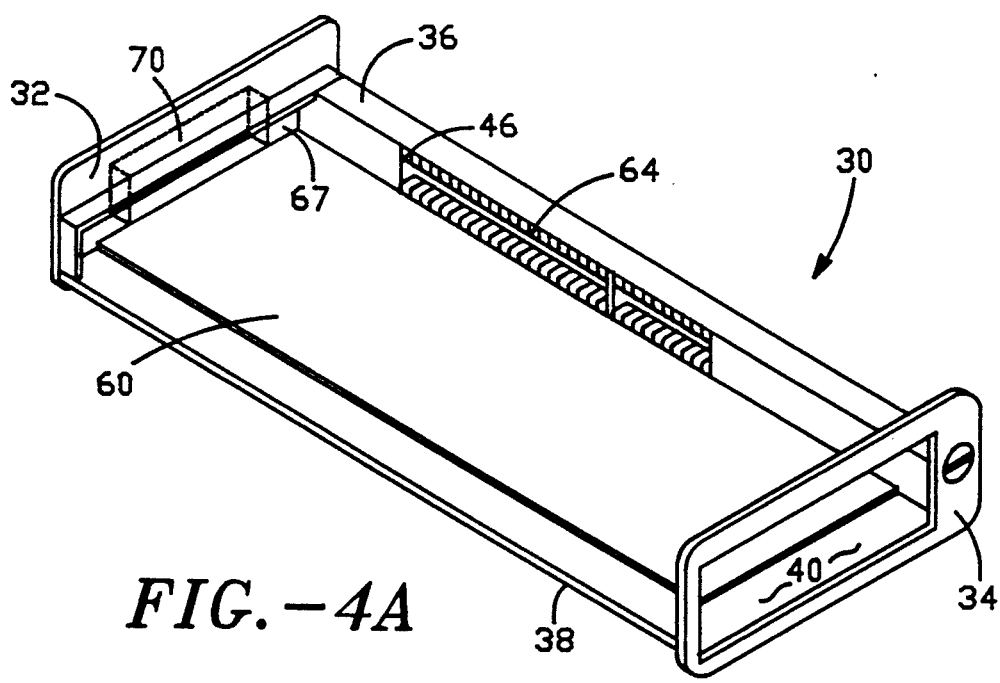
Figure 7:
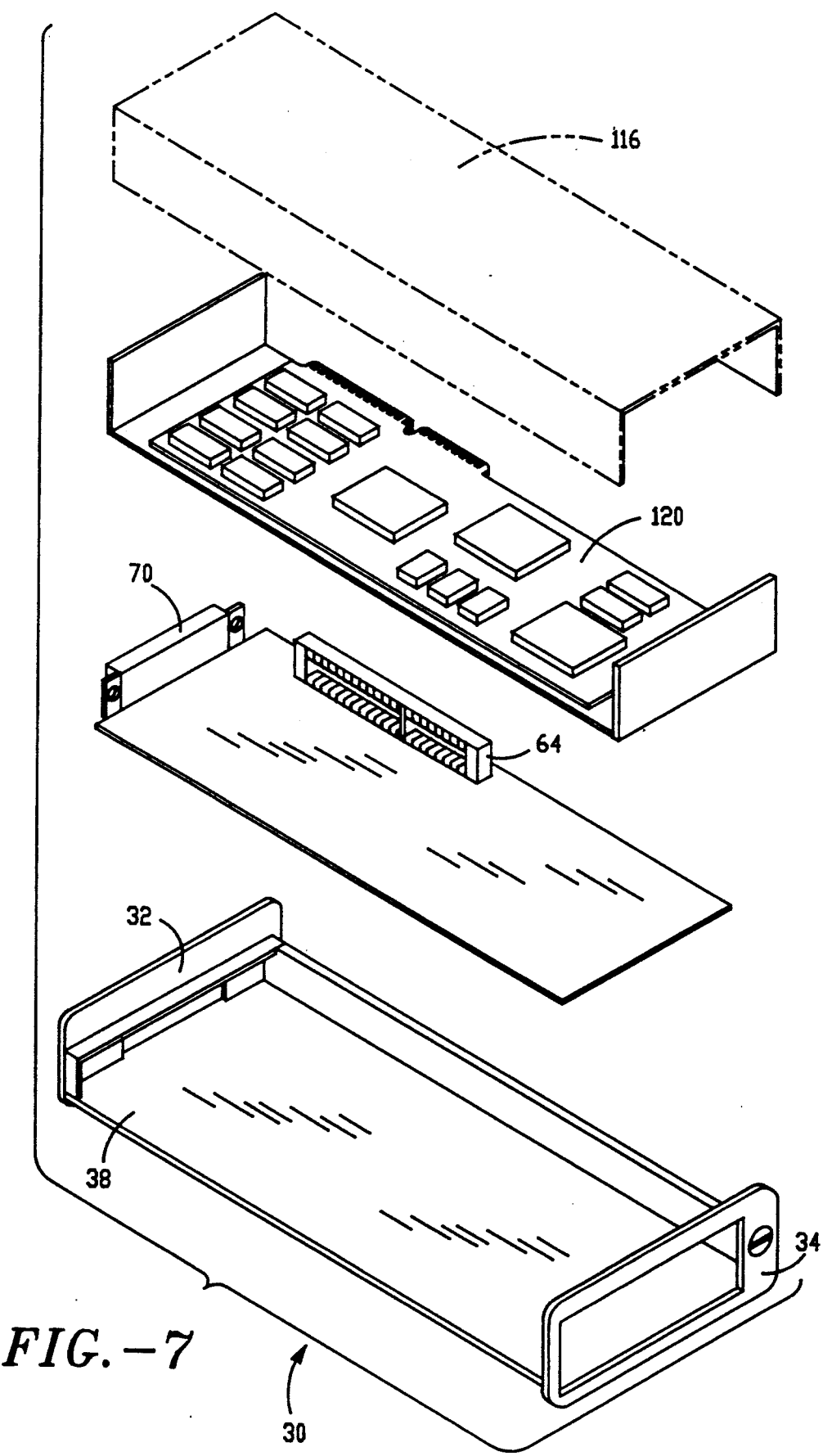
FIG. 7 is an exploded view of a tray, but adaptor board with a sixteen bit female bus connector, full size video card and cartridge housing.

As shown in FIG. 4, side wall 36 may include a recess 46 for a female bus connector which accommodates standard off-the-shelf system component connectors. One or more recesses 46 may be provided in the side wall 36, as shown in FIG. 4A, or the recesses may be omitted, as shown in FIGS. 6 and 7. Other standard bus interfaces connectors may be used on the adaptor board, such as EISA (extended industry standard architecture 32-bit), Micro Channel 32-bit, ISA, SPARC, NEXT, or Apple NuBus connectors.

Figure 5A:
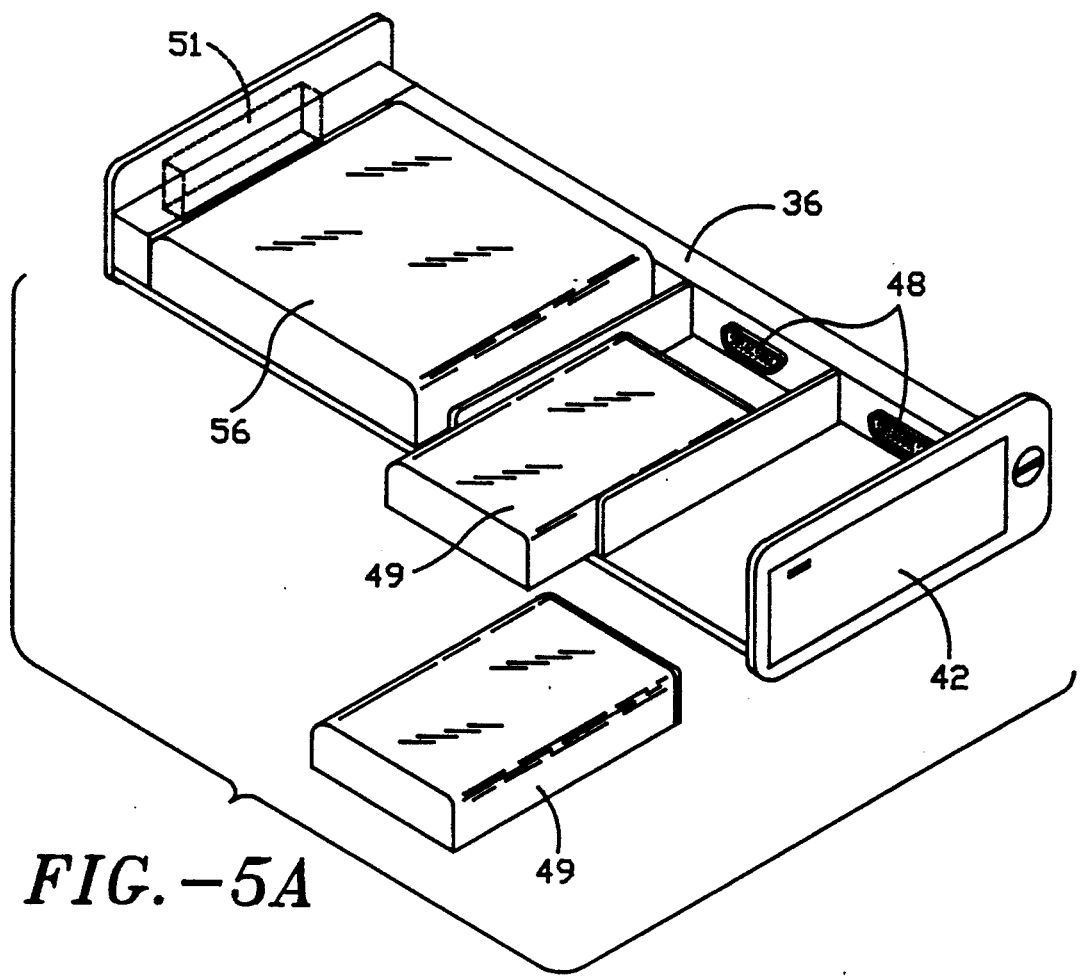
FIG. 5A is a perspective view of a tray showing two hard disk drives and a hard drive controller in cartridges.

As shown in FIG. 5A, side wall 36 may define connectors 48 for attaching two 2½ inch rigid disk drives 49 with a controller 56 therefor. Alternatively as shown in FIG. 5, four rigid disk drives may be used. For the aspect shown in FIG. 5, four connectors 48 for the drives are connected, preferably through the side wall 36, into an adaptor for the backplane or to a bus connector 51 for attachment to controller board (not shown) in a contiguous tray, the controller board in turn connecting to a SCSI controller (not shown) attached to the backplane.

In a preferred embodiment, the trays 30 accommodate the connectors of the following off-the-shelf system components: a 3½ inch floppy disk drive 50, a 5¼ inch floppy disk drive 52, a CD ROM card 54, a hard disk drive assembly 56, a motherboard, an I/O card, and a video card 120. Other electrical devices may be installed in the trays 30 including additional add-in boards.

Referring now to FIG. 4 and the exploded views in FIGS. 6 and 7, each tray 30 includes a double sided bus adaptor board 60 preferably affixed in any suitable manner to the bottom wall 38 and extending the full length of the tray 30. The bus adaptor board 60 may have a card edge connector, a pin connector or a mating male connector 70 at the rear most short side of the board 60, depending upon the type of bus connectors used on the interfacing passive backplane.

At least one female edge card connector 64, (8 pin in FIG. 6 and 16 pin in FIG. 7), preferably two 16 pin connectors as shown in FIG. 4, is preferably soldered to the top surface of the board 60 and electrically connected to the traces on the board 60. The female connectors 64 are suitable for connecting all standard IBM compatible system components presently inserted into expansion slots of personal computers. The connectors 64 utilize 90 degree mounting to enable one or more system components to be attached parallel to the board 60. The bus adaptor board 60 converts the bus connection at 64 to the bus connection at 70, best shown in FIG. 4.

The FIG. 6 exploded view further includes a floppy disk drive 110, a controller card 112, and upper 114 and lower two cartridge covers 114 (only one cover is shown). The FIG. 7 exploded view includes a full size video card 120 and cartridge cover 116.

Figure 3A:
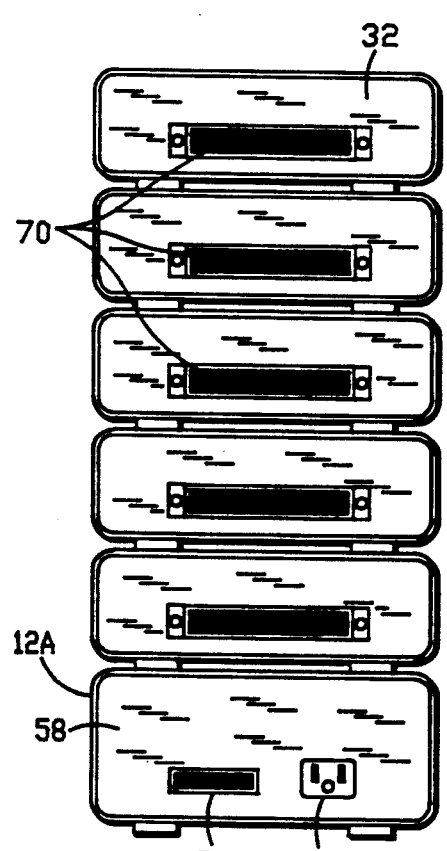
FIGS. 3A and 3B are respectively rear views of the six stacked bays of FIG. 2 at the left and the inside of the back cover at the right showing the passive backplane board.

As best shown in FIG. 3A, the power supply 58 is housed in a larger bay 12A and a power cord plug 57 and an I/O 59 plug extend from the rear of the power supply 58 for connection to an electrical source. A cable harness may be used to extend power from the power supply 58 to peripherals and disk drives. The cable harness may also be used to contain I/O signal cables within a single harness.

The connector 70 at the rear of the bus adaptor board 60, an edge card connector, male connector or pressure connector, interfaces the system component in the tray 30 through the back wall 32 to the passive backplane connector board 90 of the modular computer chassis 10. When standard edge card connectors are used on the backplane board 90, the adaptor board 60 utilizes edge connectors.

Figure 3B:
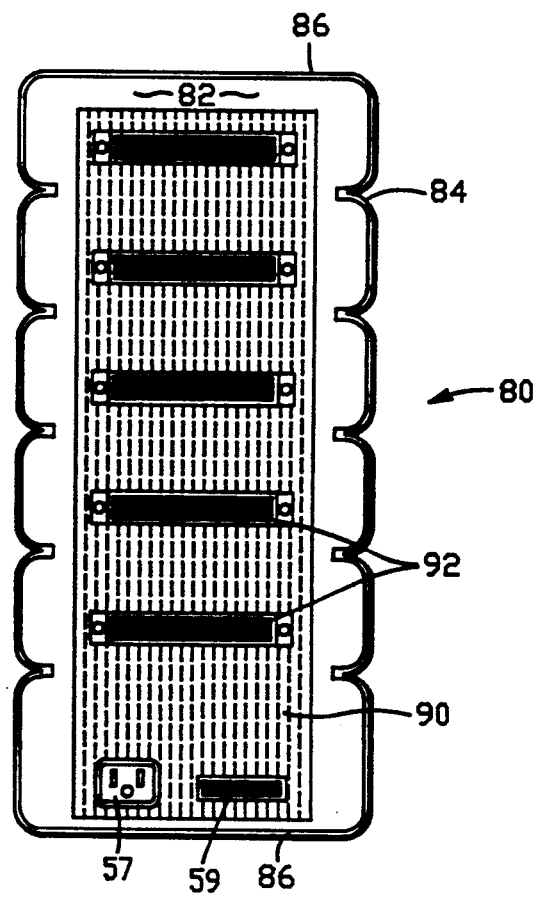

Referring now to FIGS. 1 and 3A and 3B, a back panel 80 slides over the chassis 10. The generally rectangular panel 80 defines a planar surface 82, 2 notched side walls 84, and top and bottom walls 86. The inside of planar surface 82 includes a passive backplane board 90 with female bus connectors 92 for connecting each component tray via a connector 70. As can be seen in FIG. 3B, the passive backplane board 90 is a printed circuit board, but may be otherwise configured to include cable connectors between the connectors 92, such as the connector 81 shown in FIG. 1 joining an additional bay to the chassi 10. In such a configuration, separate circuit boards are used to mount each connector 92, and the separate boards are interconnected with cable connectors. The board 90 includes a power connector 88 and an I/O connection 89.

Figure 8:
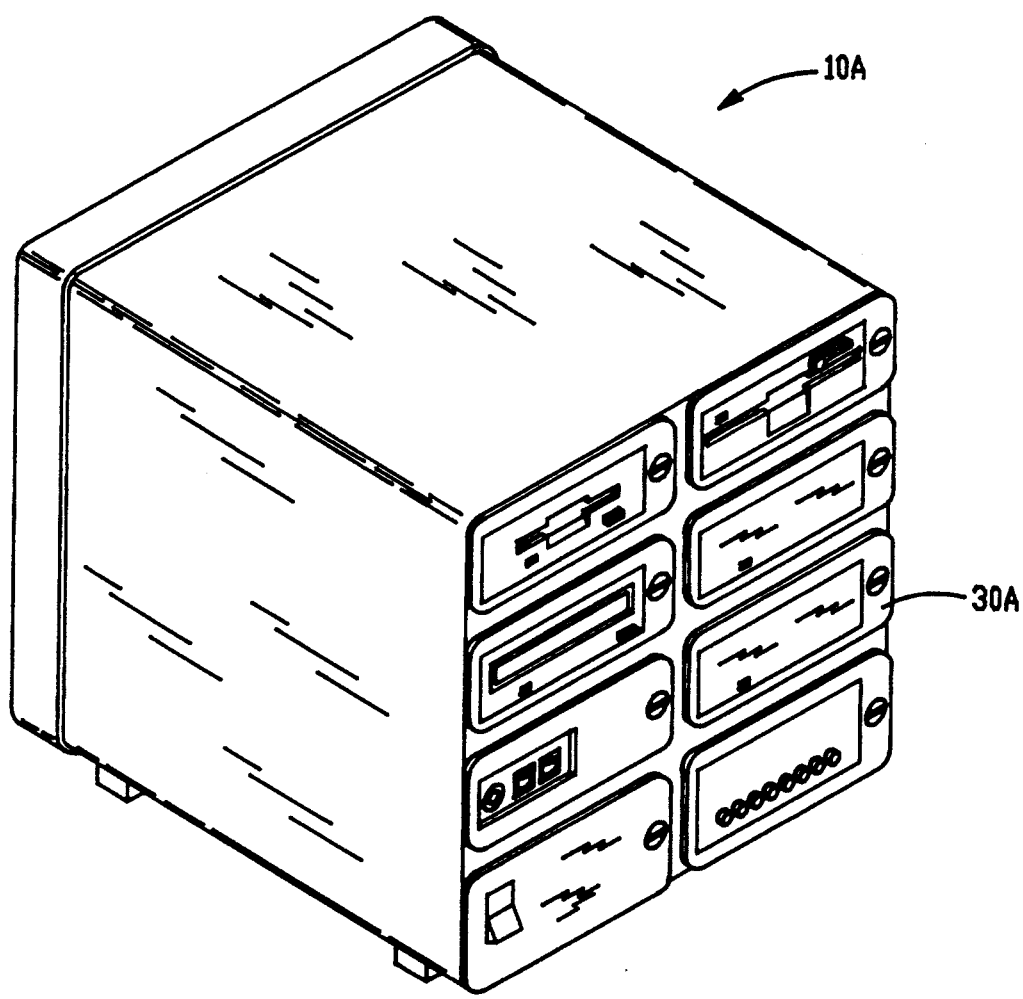
FIG. 8 is a perspective view in elevation of another aspect of the present invention showing a unitary chassis with passive backplane having four vertically stacked trays in each of two columns of bay slots.

In a second aspect of the present invention shown in FIG. 8, the chassis 10A is a unitary structure defining bay slots for receipt of removable individual trays 30A. Alternatively, the connectors at the rear of the trays 30A may plug into an adaptor which in turn connects to a standard, full sized motherboard inserted vertically from the top of the chassis. Also, the motherboard may be inserted from the side of the chassis 10A in which case, in at least some instances, it is possible to plug the trays 30A directly into the motherboard. It will be recognized by those skilled in the art, that if a conventional motherboard is so inserted, all of the trays cannot be attached to the motherboard.

As can be seen from the above description of the preferred embodiments, the modular computer system uses a passive backplane to interface standard off-the-shelf computer components with a separate system bus board.

The apparatus described herein is illustrative of the principles of the invention and is not meant to be limiting of its scope. Various other embodiments will be apparent to those skilled in the art, such as mounting a motherboard vertically within a personal computer chassis to serve as a backplane connector, and may be made without departing from the spirit and scope of the invention as defined by the following claims.

What is claimed is:

1. A modular computer chassis comprising:
   a plurality of removable trays, each tray being configured to mechanically house either at least one expansion card or at least one peripheral device and having a first connector means contained within the tray for establishing electrical connection to such at least one expansion card or peripheral device, and further having a second connector electrically connected to the first connector means;
   a plurality of separate interconnectable bays, each bay adapted to house a removable tray, each bay having mechanical mounting means for positioning the tray and the at least one expansion card or peripheral device contained within the tray in a stable position within the bay;
   backplane means for establishing electrical communication among the removable trays, the backplane means having a plurality of backplane connectors and each backplane connector adapted to receive a second connector for electrically interconnecting the trays when mounted in the bays; and
   removable rear cover means for mounting the backplane means on an inner surface thereof, the plurality of interconnectable bays being attached to the rear cover means.

2. The system of claim 1 further comprising at least one cable connector means for attaching a bay from a remote location to a backplane connector.

3. The system of claim 1 further comprising a plurality of cable connector means for interconnecting the backplane connectors on the backplane means.

4. The system of claim 1 further comprising a front cover means for encasing the trays within the bays and for access to the trays, the front cover means having means for attachment to the plurality of bays.

5. The system of claim 4 wherein the front cover means comprises a separate removable panel associated with each tray for access to the at least one expansion card or peripheral device.

6. The system of claim 1 wherein each interconnectable bay defines mating mounting means for mechanically interconnecting the bays.

7. The system of claim 1 wherein the bays are sized to accommodate at least one standard, personal computer expansion card or peripheral device.

8. The system of claim 1 further comprising a power supply housed in a bay and having a cable harness means extending therefrom for attachment to at least one computer peripheral device.

9. The system of claim 1 further comprising a circuit board means within each tray for electrically connecting the first connector means and the second connector means and for changing the direction of the electrical connection between the first connector means and the at least one expansion card or peripheral device.

10. The system of claim 1 wherein the first connector means is a conventional female bus connector.

11. The system of claim 1 wherein the backplane means comprises circuit board means and a plurality of female connectors mounted thereto.

12. The system of claim 10 wherein the circuit board means is a single board for mounting the plurality of female connectors.

13. The system of claim 10 wherein the circuit board means is a plurality of circuit boards for mounting the female connectors and further comprising a plurality of cable connectors for interconnecting the plurality of circuit boards.

* * * * *